(12) United States Patent
Jeong et al.

(10) Patent No.: US 11,550,456 B2
(45) Date of Patent: Jan. 10, 2023

(54) METHOD FOR MAPPING FUNCTION OF APPLICATION AND ELECTRONIC DEVICE THEREFOR

(71) Applicant: Samsung Electronics Co., Ltd., Gyeonggi-do (KR)

(72) Inventors: Kyungho Jeong, Gyeonggi-do (KR);
Yoonsu Kim, Gyeonggi-do (KR);
Jaeseok Myung, Gyeonggi-do (KR);
Sahnghee Bahn, Gyeonggi-do (KR);
Jung Joo Sohn, Gyeonggi-do (KR);
Youngkyu Jin, Gyeonggi-do (KR);
Yeseul Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/971,014

(22) PCT Filed: Feb. 19, 2019

(86) PCT No.: PCT/KR2019/002000
§ 371 (c)(1),
(2) Date: Aug. 19, 2020

(87) PCT Pub. No.: WO2019/160395
PCT Pub. Date: Aug. 22, 2019

(65) Prior Publication Data
US 2021/0081097 A1    Mar. 18, 2021

(30) Foreign Application Priority Data

Feb. 19, 2018 (KR) .................... 10-2018-0019426

(51) Int. Cl.
*G06F 3/048* (2013.01)
*G06F 3/04842* (2022.01)
(Continued)

(52) U.S. Cl.
CPC ............ *G06F 3/04842* (2013.01); *G06F 3/02* (2013.01); *G06F 3/0481* (2013.01); *G06F 3/0488* (2013.01); *G06F 9/451* (2018.02)

(58) Field of Classification Search
CPC ...... G06F 3/04842; G06F 3/02; G06F 3/0481; G06F 3/0488; G06F 9/451
See application file for complete search history.

(56) References Cited

U.S. PATENT DOCUMENTS 7,134,094 B2    11/2006  Stabb et al.
8,255,833 B2 *  8/2012   Shimada .............. G11B 19/022
                                            715/847
(Continued)

FOREIGN PATENT DOCUMENTS

KR   10-2006-0033664 A    4/2006
KR   10-2006-0033840 A    4/2006
(Continued)

OTHER PUBLICATIONS

Understanding Tasks and Backstacks, pp. 1-13.
(Continued)

*Primary Examiner* — Mahelet Shiberou
(74) *Attorney, Agent, or Firm* — Cha & Reiter, LLC

(57) ABSTRACT

An electronic device according to various embodiments of the present invention may comprise: a display; a memory; and a processor operatively connected to the display and the memory, wherein the processor is configured to: detect occurrence of a function mapping event while an application screen is displayed; identify at least one object for detection of a designated event among at least one object displayed on the application screen; receive an input for selection of one of the identified at least one object; and map and store a function of the object, selected on the basis of the input, to a trigger event. Other embodiments are also possible.

10 Claims, 15 Drawing Sheets

(51) Int. Cl.
  *G06F 9/451* (2018.01)
  *G06F 3/02* (2006.01)
  *G06F 3/0481* (2022.01)
  *G06F 3/0488* (2022.01)

(56) References Cited

U.S. PATENT DOCUMENTS

| | | | | |
|---|---|---|---|---|
| 10,684,768 B2* | 6/2020 | Grossman | | G06F 3/0488 |
| 10,924,676 B2* | 2/2021 | Kraft | | G06T 11/00 |
| 2002/0115476 A1* | 8/2002 | Padawer | | H04M 1/72403 |
| | | | | 455/564 |
| 2005/0149971 A1* | 7/2005 | Hallberg | | G06F 3/0481 |
| | | | | 725/52 |
| 2007/0013672 A1* | 1/2007 | Shim | | G06F 3/04886 |
| | | | | 345/173 |
| 2007/0051792 A1 | 3/2007 | Wheeler et al. | | |
| 2007/0270179 A1 | 11/2007 | Lee et al. | | |
| 2009/0138910 A1* | 5/2009 | Jin | | H04L 67/34 |
| | | | | 725/38 |
| 2009/0158213 A1 | 6/2009 | Ryu | | |
| 2009/0313581 A1* | 12/2009 | Martin | | G06F 3/04892 |
| | | | | 715/827 |
| 2010/0088598 A1* | 4/2010 | Lee | | H04M 1/72469 |
| | | | | 715/704 |
| 2012/0044164 A1 | 2/2012 | Kim et al. | | |
| 2013/0311948 A1* | 11/2013 | McCoy | | G06F 3/017 |
| | | | | 715/825 |
| 2014/0071058 A1* | 3/2014 | Cudak | | G06F 3/0482 |
| | | | | 345/173 |
| 2014/0101588 A1* | 4/2014 | Chang | | G06F 3/04817 |
| | | | | 715/810 |
| 2015/0058776 A1* | 2/2015 | Liu | | G06F 3/04895 |
| | | | | 715/771 |
| 2016/0127654 A1 | 5/2016 | Kraft et al. | | |
| 2018/0129396 A1* | 5/2018 | Buckley | | G06F 3/0489 |

FOREIGN PATENT DOCUMENTS

| | | |
|---|---|---|
| KR | 10-2012-0016729 A | 2/2012 |
| KR | 10-2014-0049881 A | 4/2014 |
| KR | 10-1398182 B1 | 5/2014 |
| KR | 10-2015-0033755 A | 4/2015 |
| KR | 10-2015-0053359 A | 5/2015 |
| KR | 10-2016-0113788 A | 10/2016 |

OTHER PUBLICATIONS

Intents and intent filters, pp. 1-23.
Opportunity for developers to not install apps, Jul. 11, 2016, pp. 1-4.
Google Play Instant, https://developer.android.com/topic/instant-apps/index.html?hl=ko.
Notice of Preliminary Rejection dated Sep. 20, 2022.

* cited by examiner

METHOD FOR MAPPING FUNCTION OF APPLICATION AND ELECTRONIC DEVICE THEREFOR

This application is a National Phase Entry of PCT International Application No. PCT/KR2019/002000, which was filed on Feb. 19, 2019, and claims priority to Korean Patent Application No. 10-2018-0019426, which was filed on Feb. 19, 2018, the contents of which are incorporated herein by reference.

TECHNICAL FIELD

Various embodiments of the disclosure relate to a method for mapping a function of an application and an electronic device therefor.

BACKGROUND ART

With the development of information and communications technology and semiconductor technology, electronic devices are developing into multimedia devices providing various services. For example, electronic devices may provide various services such as broadcasting services, wireless Internet services, music services, etc.

Service providers develop various applications to provide various services described above, and provide them to electronic devices. Accordingly, a user of an electronic device may receive a desired service through an application by downloading and installing the application corresponding to the desired service.

Recently, applications that support a shortcut function regarding a function frequently used by a user from among a plurality of functions provided by an application are developing in consideration of users' convenience. Accordingly, a user of an electronic device may use a specific function of an application through an input on a shortcut icon regarding the specific function, a hardware key mapped onto the specific function, or a smart button mapped onto the specific function, without an additional input.

DISCLOSURE OF INVENTION

Technical Problem

An electronic device may provide a shortcut function only for some functions set by a service provider to support a shortcut function from among a plurality of functions included in an application. Accordingly, a user of the electronic device may not use the shortcut function for other functions that are not set by the service provider to support the shortcut function, which causes inconvenience.

Various embodiments of the disclosure provide a method for supporting a shortcut function for a plurality of functions included in an application, and an electronic device therefor.

Solution to Problem

An electronic device may provide a shortcut function only for some functions set by a service provider to support a shortcut function from among a plurality of functions included in an application. Accordingly, a user of the electronic device may not use the shortcut function for other functions that are not set by the service provider to support the shortcut function, which causes inconvenience.

Various embodiments of the disclosure provide a method for supporting a shortcut function for a plurality of functions included in an application, and an electronic device therefor.

Advantageous Effects of Invention

The electronic device according to various embodiments of the disclosure can identify an object enabling function mapping from among at least one object included in an application by itself, and can provide the object the user, such that a shortcut function can be applied to a function that is set by a service provider developing the application not to support the shortcut function, from among the functions included in the application.

BEST MODE FOR CARRYING OUT THE INVENTION

Figure 1:
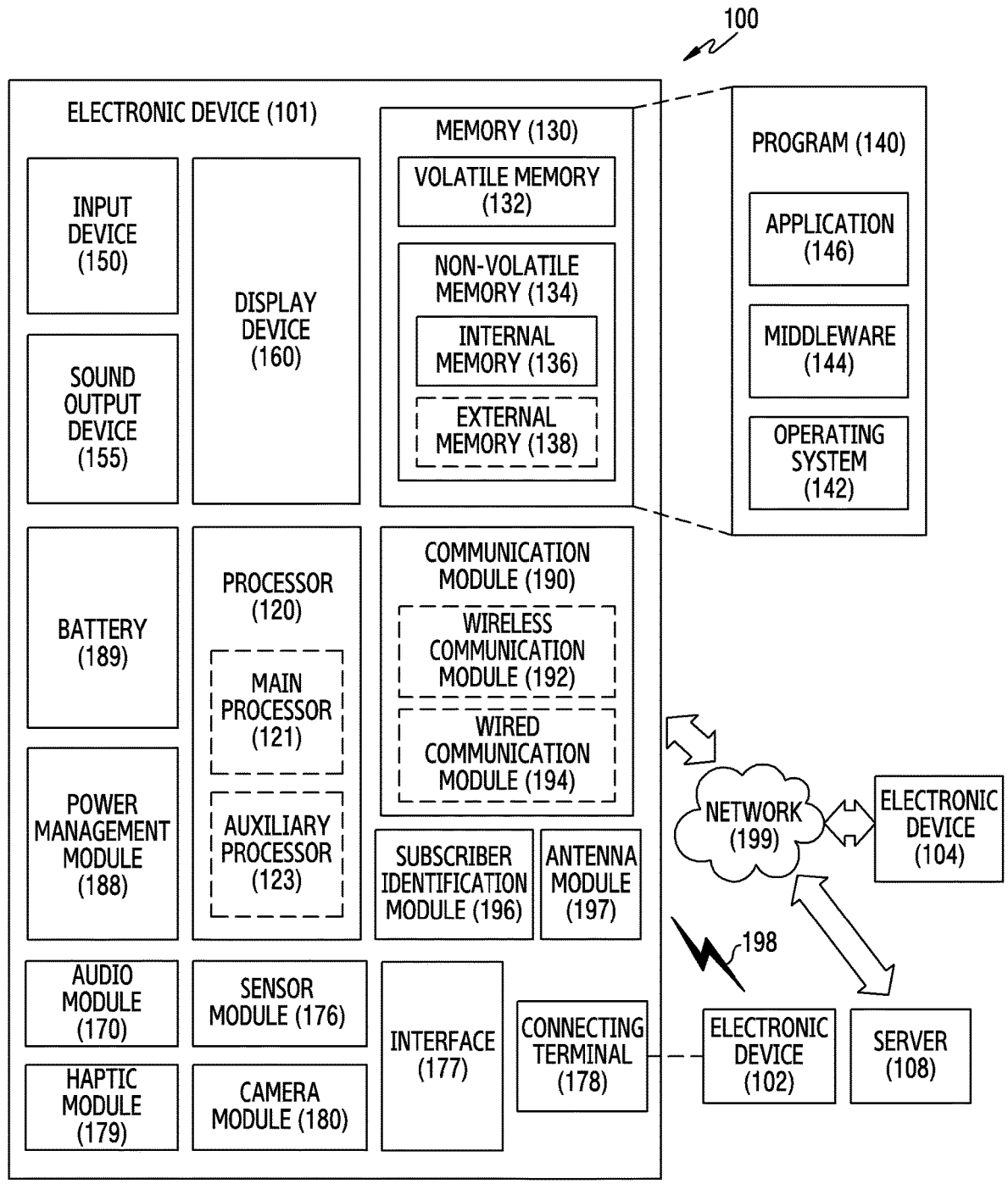
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment may communicate with an electronic device 102 via a first network 198 (e.g., a short-range wireless communication network), or an electronic device or a server 108 via a second network 199 (e.g., a long-range wireless communication network). According to an embodiment, the electronic device may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the processor 120 may determine whether a function mapping event occurs while an application is being executed. For example, the processor 120 may determine whether an input on a hardware key associated with the function mapping event from among a plurality of hardware keys exposed through a portion of a housing of the electronic device 101 is received. In another example, the processor 120 may determine whether an input on a soft key associated with the function mapping event from among a plurality of soft keys provided through the display device 160 is received. In still another example, the processor 120 may determine whether a signal associated with the function mapping event is received from an external electronic device (for example, a smart button) connected with the electronic device 101 via wireless communication.

According to an embodiment, when the function mapping event occurs, the processor 120 may identify at least one object for detecting a designated event (for example, a touch event) on an application screen displayed through the display device 160.

According to an embodiment, the processor 120 may apply a designated effect (for example, a highlighting effect) to the at least one object for detecting the designated event in order for a user to recognize the at least one object for detecting the designated event. According to an embodiment, the processor 120 may apply a designated effect (for example, a shading effect, a blur effect, etc.) to the other area that does not display the at least one object for detecting the designated event on the application screen in order for the user to recognize the at least one object for detecting the designated event.

According to an embodiment, the processor 120 may map and store a function of an object selected from the at least one object for detecting the designated event according to a user input onto a trigger event. For example, the processor 120 may identify object information of the object selected by the user input (for example, position information (for example, coordinates information), object name information, or object ID information, etc.), and restoration information for restoring the application screen (for example, information regarding an entry route until the currently displayed application screen is displayed after the application is executed, and information (for example, login information, input information, etc.) transmitted to display the application screen, or page information of the application screen). The processor 120 may map and store the object information and the restoration information onto the trigger event. Herein, the trigger event may include a hardware key, a soft key, a signal received from an external electronic device (for example, a smart button), etc.

According to an embodiment, when a trigger event is detected after the function of the object selected according to the user input is mapped onto the trigger event and is stored, the processor 120 may execute the function of the object mapped onto the trigger event. For example, the processor 120 may restore the application screen which is displayed when the function is mapped, on the basis of the restoration information. The processor 120 may identify the object selected according to the user input on the restored application screen, on the basis of the object information. The processor 120 may generate a touch event on the object selected according to the user input, thereby performing the function corresponding to the corresponding object.

According to various embodiments, an electronic device (for example, the electronic device 101) may include a display (for example, the display device 160), a memory (for example, the memory 130), and a processor (for example, the processor 120) operatively connected with the display and the memory, and the processor may be configured to: detect occurrence of a function mapping event while an application screen is being displayed; identify at least one object for detecting a designated event from among at least one object displayed on the application screen; receive an input for selecting any one of the at least one identified object; and map and store a function of the object selected based on the input onto a trigger event.

According to various embodiments, the processor may be configured to detect the occurrence of the function mapping event, on the basis of an input on at least one hardware key designated from among a plurality of hardware keys exposed through at least a portion of a housing of the electronic device.

According to various embodiments, the processor may be configured to detect the occurrence of the function mapping event, on the basis of a touch input on a soft key for requesting function mapping from among a plurality of soft keys provided through the display.

According to various embodiments, the electronic device may further include a communication circuit (for example, the communication module 190) configured to connect with an external electronic device via wireless communication, and the processor may be configured to detect the occurrence of the function mapping event, on the basis of whether a signal for requesting function mapping is received from the external electronic device through the communication circuit.

According to various embodiments, the processor may be configured to identify at least one object for detecting a touch event from among the at least one object displayed on the application screen.

According to various embodiments, the processor may be configured to apply a designated effect to the at least one identified object.

According to various embodiments, the processor may be configured to apply a designated effect to the other area except for the identified object on the application screen.

According to various embodiments, the processor may be configured to: identify object information of the object selected based on the input; identify restoration information for restoring the application screen; and map and store the object information and the restoration information onto the trigger event corresponding to the function mapping event.

According to various embodiments, the processor may be configured to: identify selected object information based on the input; identify restoration information for restoring the application screen; control the display to display a user interface including at least one trigger event; receive a user input of selecting one of the at least one trigger event; and map and store the object information and the restoration information onto the trigger event selected based on the user input.

According to various embodiments, the processor may be configured to: detect the trigger event; identify object information and restoration information which are mapped onto the trigger event; restore the application screen on the basis of the restoration information; and generate a touch event on an object corresponding to the trigger event on the basis of the object information.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
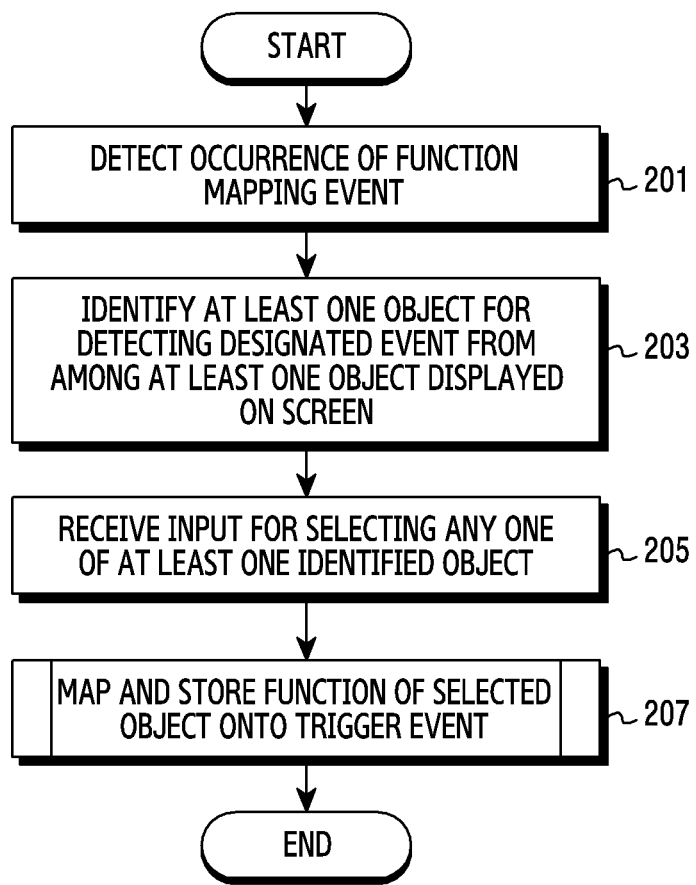
FIG. 2 is a flowchart to explain a method for mapping a function of an application in an electronic device according to various embodiment.

FIG. 2 is a flowchart to explain a method for mapping a function of an application in an electronic device according to various embodiments.

Referring to FIG. 2, in operation 201, a processor (for example, the processor 120) of the electronic device (for example, the electronic device 101) may detect occurrence of a function mapping event while an application screen is being displayed. For example, when a user input for mapping a function of the application is received while the application is being executed, the processor may determine that the function mapping event occurs. Herein, the event for mapping the function of the application may be received through a hardware key exposed through a portion of a housing of the electronic device, a soft key displayed through a display (for example, the display device 160) of the electronic device, motion information acquired through a sensor (for example, the sensor module 176) of the electronic device, etc. In another example, the processor may determine whether a signal for requesting mapping of the function of the application is received from an external electronic device (for example, a smart button) connected with the electronic device wirelessly through a communication circuit (for example, the communication module 190) while the application is being executed. When the signal for requesting mapping of the function of the application is received, the processor may determine that the function mapping event occurs.

In operation 203, the processor may identify at least one object for detecting a designated event from among at least one object displayed on the application screen. For example, when the function mapping event is detected while a music list is being displayed in the electronic device through a music application, the processor may identify icons (for example, a sound source icon, a search window, etc.) on which a touch input is detectable (which has a touch event) in the music list. In another example, when the function mapping event is detected while a list of contacts of a call application is being displayed in the electronic device, the processor may identify icons (for example, a contact icon, a bookmark icon, a recent call icon, a keypad icon, a voicemail box icon, etc.) on which a touch input is detectable in the list of contacts (icons which perform a function mapped based on a touch input). According to an embodiment, the processor may apply a designated effect (for example, a highlighting effect) to the at least one identified object, or may apply a designated effect (for example, a shading effect) to the other area except for the at least one identified object, such that the at least one identified object can be recognized by a user.

In operation 205, the processor may receive an input for selecting any one of the at least one identified object. For example, the processor may receive a user input of selecting a specific sound source icon in the music list through an input device (for example, the input device 150) or the display. In another example, the processor may receive a user input of selecting a specific contact icon in the list of contacts through the input device or the display.

In operation 207, the processor may map and store a function of the selected object onto a trigger event. The processor may identify object information of the object selected based on the input, and restoration information for restoring the application screen displayed through the display. Herein, the object information may include position information (for example, coordinates information), object name information, or object ID information of the object selected based on the input. The restoration information may include information regarding an entry route until the currently displayed application screen is displayed after the application is executed, information (for example, login information, input information, etc.) transmitted to display the application screen, or page information of the application screen, etc. When the processor identifies the object information and the restoration information, the processor may map and store the object information and the restoration information onto the trigger event. For example, when the function mapping event is detected through the hardware key, the processor may determine a designated hardware key as the trigger event. The processor may map and store the object information and the restoration information onto information associated with the hardware key, such that when an input on the hardware key determined as the trigger event is performed, a function corresponding to the selected object is performed. In another example, when the function mapping event is detected through the soft key, the processor may generate a soft key for generating the trigger event on a home screen (or a designated route) of the electronic device. The processor may map and store the object information and the restoration information onto information on the generated soft key, such that when a touch input on the generated soft key is received, the function corresponding to the selected object is performed. In still another example, when the function mapping event is detected based on the signal received from the external electronic device connected with the electronic device via wireless communication, the processor may identify information associated with a signal for executing a function from information included in the received signal. The processor may map and store the object information, the restoration information, and the information associated with the signal for executing the function, such that when the signal for executing the function is received from the external electronic device, the function corresponding to the selected object is performed. In yet another example, the processor may identify a trigger event (for example, a hardware key, a soft key, or a signal of an external electronic device, etc.) set by the user or a manufacturer before the function mapping event occurs. The processor may map and store the object information and the restoration information onto the identified trigger event. For example, when the user of the electronic device sets a specific hardware key as the trigger event before the function mapping event occurs, the processor may map and store the object information and the restoration information onto the specific hardware key set by the user as the trigger event. Herein, the trigger event set to be mapped with the object information and the restoration information may be changed to another trigger event by the user. In another example, when an input for selecting any one of the at least one identified object is received, the processor may control the display to display a user interface for selecting at least one icon (for example, a hardware key icon, a soft key icon, or a smart button icon, etc.) associated with the trigger event. When a user input of selecting one of the at least one icon displayed within the user interface is received, the processor may map and store the object information and the restoration information onto the trigger event corresponding to the selected icon.

As described above, the electronic device according to various embodiments of the disclosure may identify an object enabling function mapping from among at least one object included in an application by itself, and provide the object to the user, such that a shortcut function can be provided, even if a service provider who develops the application does not develop the application in consideration of shortcut function mapping.

Although it is illustrated in the above-described example that the electronic device maps and stores the function of the selected object onto one trigger event, the electronic device according to various embodiments of the disclosure may map and store the function of the selected object onto a plurality of trigger events. For example, the processor of the electronic device may map and store the function of the selected object onto two or more trigger events of the trigger events such as the hardware key, the soft key, or the signal of the external electronic device (for example, the smart button).

Figure 3A:
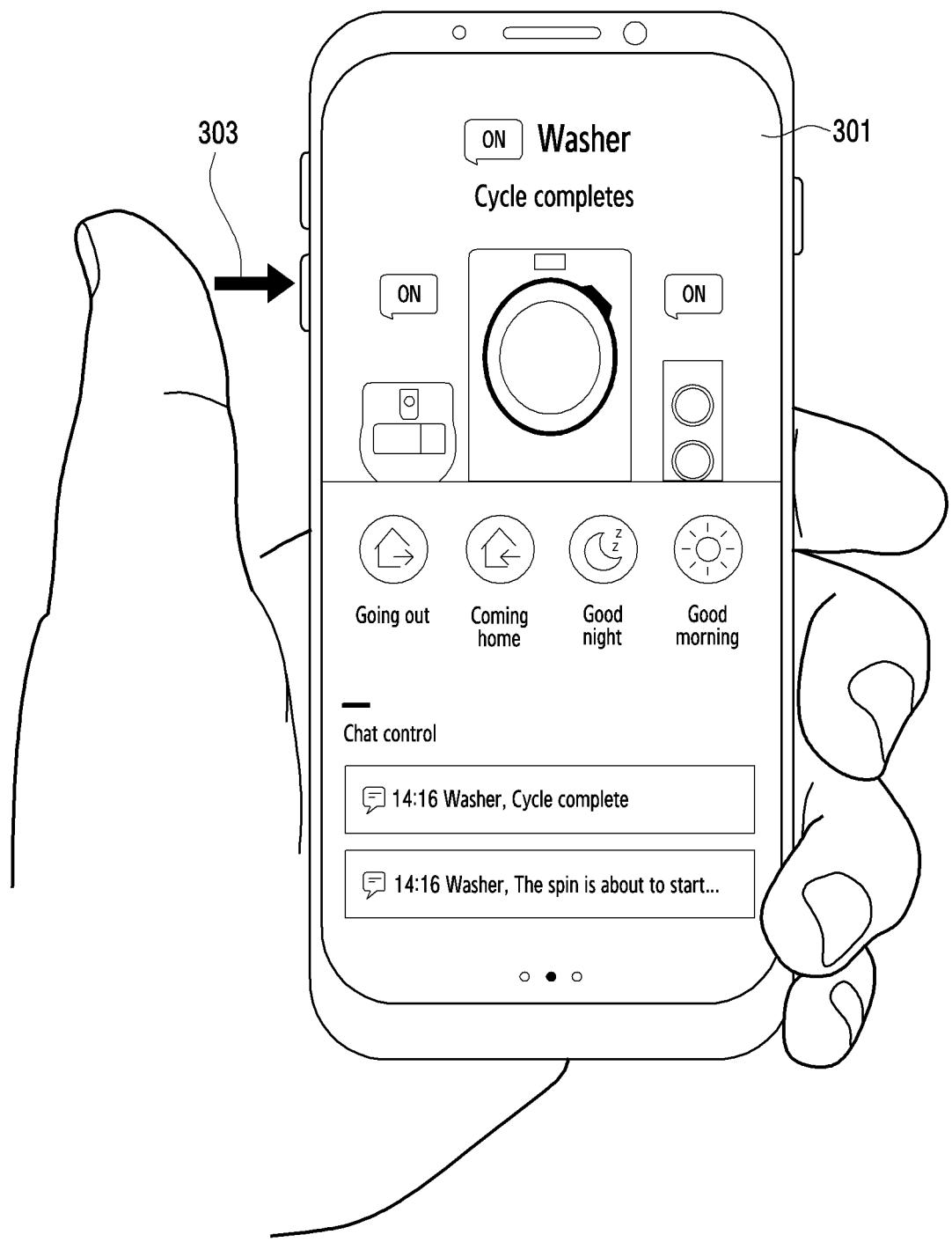
FIGS. 3A to 3E are views to explain a method for detecting occurrence of a function mapping event in an electronic device according to various embodiments.
Figure 3B:
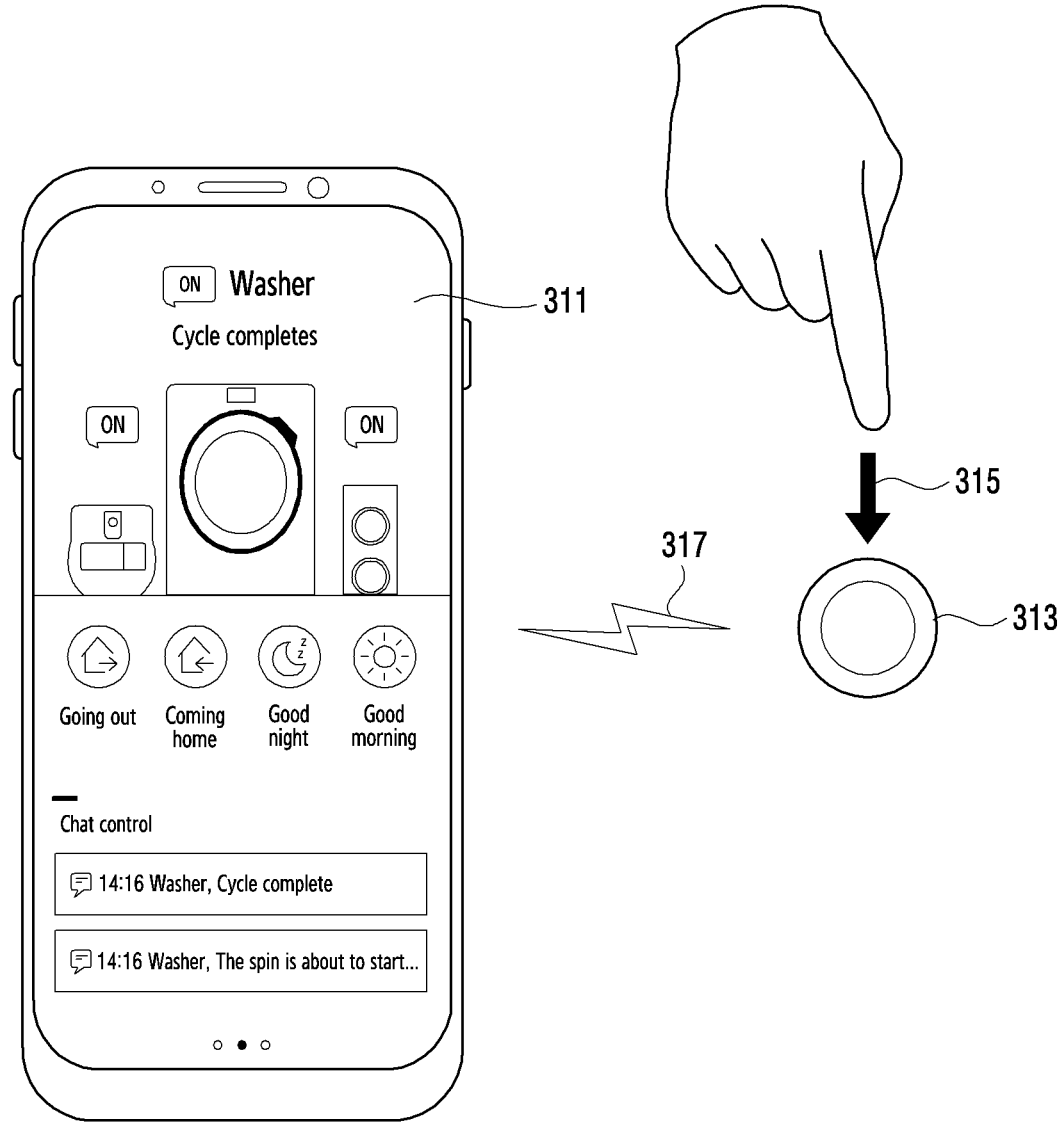
Figure 3C:
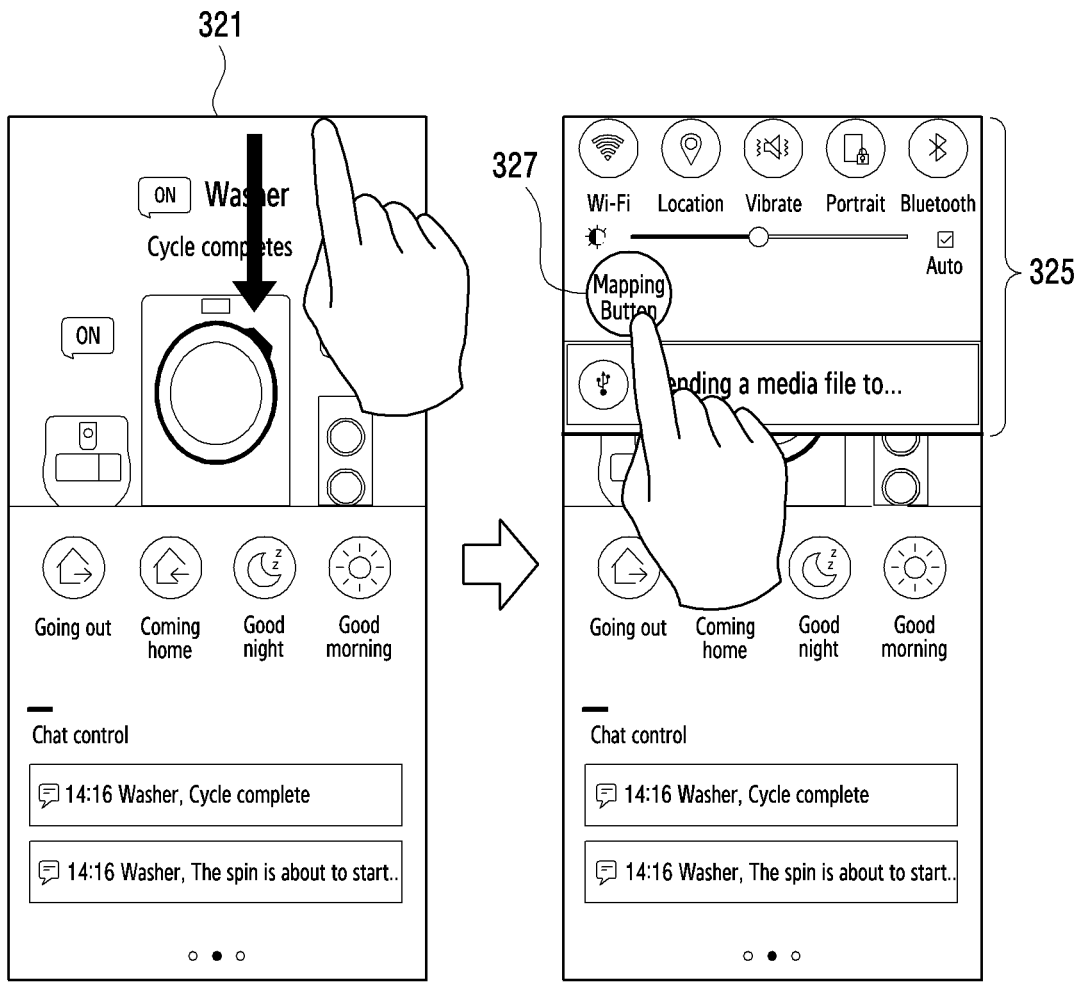

FIGS. 3A to 3C are views to explain a method for detecting occurrence of a function mapping event in an electronic device according to various embodiments.

According to an embodiment, when an input 303 of a user on a designated hardware key from among a plurality of hardware keys included in the electronic device 301 is detected as shown in FIG. 3A, a processor (for example, the processor 120) of the electronic device (for example, the electronic device 101) may determine that a function mapping event occurs. The input 303 of the user on the hardware key may include one or more button inputs on the hardware key. According to an embodiment, the designated hardware key may be changed based on an input of the user. According to an embodiment, the input 303 of the user on the hardware key may include an input on a plurality of designated hardware keys from among the plurality of hardware keys included in the electronic device 301.

According to an embodiment, when a signal for requesting function mapping is received from an external electronic device 313 (for example, a smart button) connected with an electronic device 311 through a communication circuit (for example, the communication module 190) via wireless communication 317 as shown in FIG. 3B, the processor may determine that the function mapping event occurs. Herein, when a first input (for example, click, double click, or hold input, etc.) is received from the user, the external electronic device 313 may transmit a signal requesting function mapping to the electronic device 313, and, when a second input (for example, click, double click, or hold input, etc.) different from the first input is received, may transmit a signal generating a trigger event.

According to an embodiment, when a touch input 323 dragged from an upper end (or a notification bar) of an application screen 321 in a designated direction (for example, in a downward direction) is detected through a display (for example, the display device 160) as shown in FIG. 3C, the processor may control the display to display a notification window 325 including at least one icon for controlling at least some functions of the electronic device in at least some areas of the application screen 321. When a touch input on an icon 327 associated with function mapping of the application from among the at least one icon displayed in the notification window 325 is detected, the processor may determine that the function mapping event occurs. Although it is illustrated in the above-described example that the input for displaying the notification window is the touch input 323 dragged from the upper end of the application screen in the designated direction, this should not be considered as limiting. For example, the input for displaying the notification window 325 may include a touch input dragged from a lower end of the application screen 321 in a designated direction (for example, an upward direction).

Figure 3D:
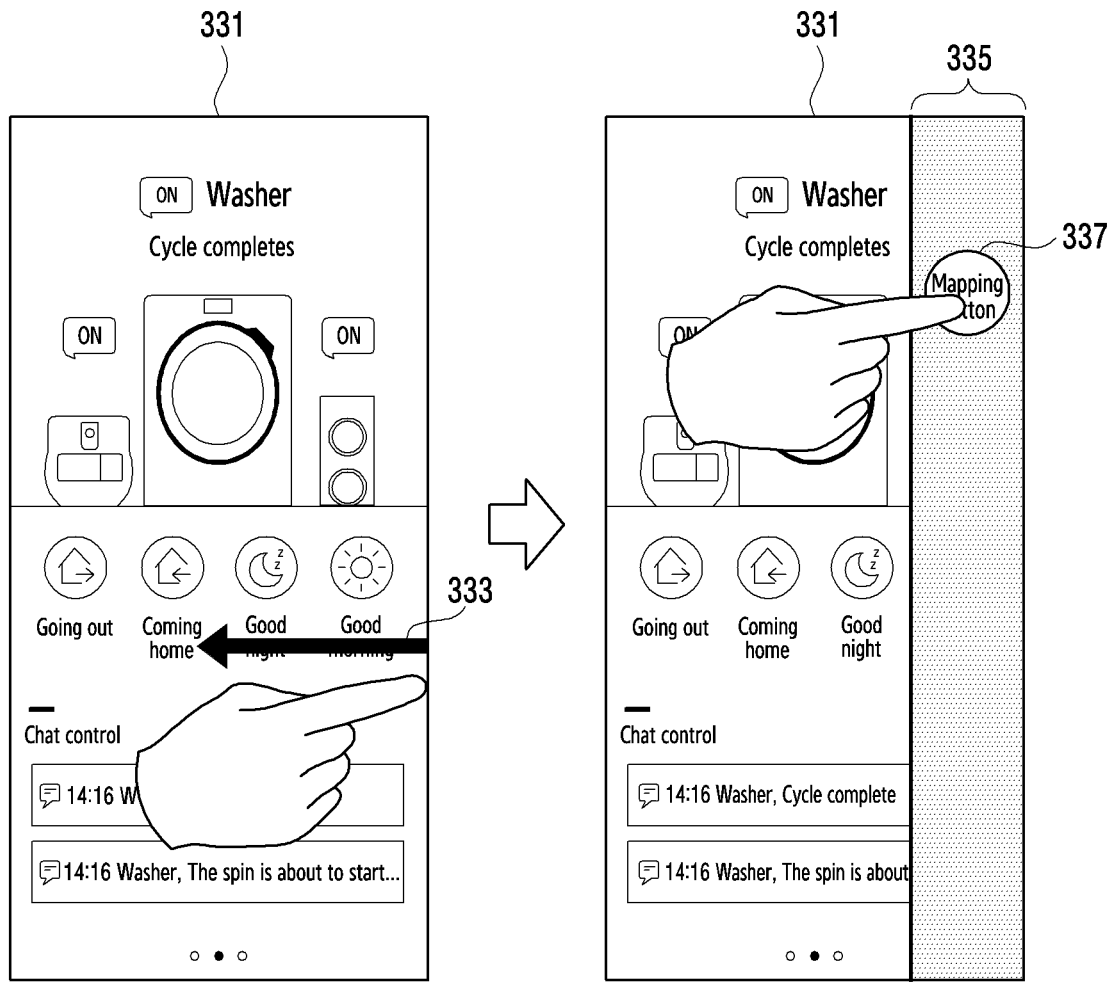

According to an embodiment, when a touch input 333 dragged from the right of an application screen 331 in a designated direction (for example, a leftward direction) is detected through the display as shown in FIG. 3D, the processor may control the display to display a notification widow 325 in at least some areas of the application screen 331. When a touch input on an icon 337 associated with function mapping of the application from among at least one icon included in the notification window 335 is detected, the processor may determine that the function mapping event occurs. According to an embodiment, while the notification window 325 is being displayed in at least some areas of the application screen 331, the processor may control the display to apply a designated effect (for example, a shading effect, a blur effect, etc.) to the other area except for the notification window 325 in the application screen 331. Although it is illustrated in the above-described example that the input for displaying the notification window 335 is the touch input dragged from the right of the application screen 331 in the designated direction, this should not be considered as limiting. For example, the input for displaying the notification window 335 may include a touch input dragged from the left of the application screen 331 in a designated direction (for example, a rightward direction).

Figure 3E:
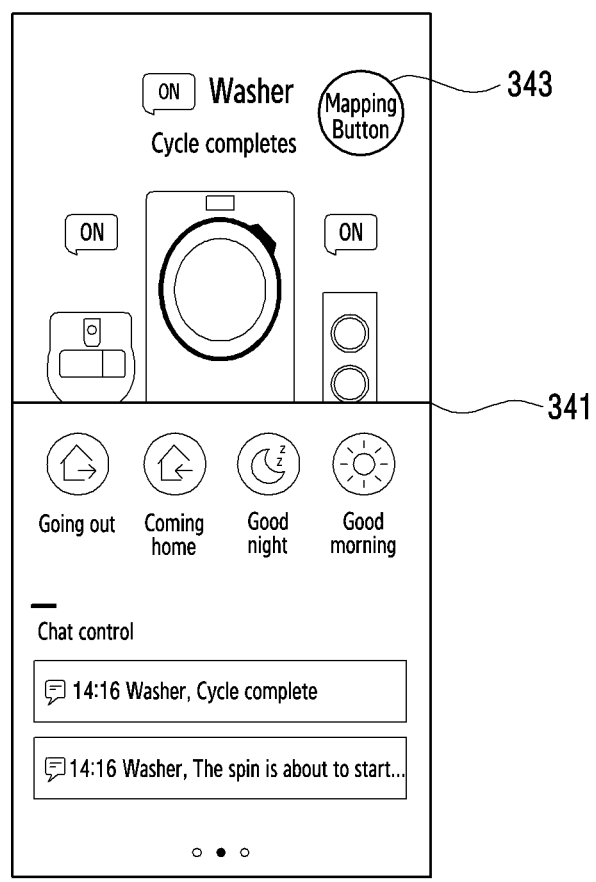

According to an embodiment, the processor may control the display to display a soft key 343 to generate a function mapping event on an application screen 341 as shown in FIG. 3E. When a touch input on the soft key 343 is detected, the processor may determine that the function mapping event occurs. According to an embodiment, the soft key 343 may not be included in a layer constituting the screen 341 of the electronic device, and may be included in a separate layer (for example, floating). According to an embodiment, the soft key may continuously be displayed at a designated position while the display is being in an on-state. According to an embodiment, the processor may change a form (for example, a shape, a size, color, etc.) and a position of the soft key 343 based on a user input.

Figure 4A:
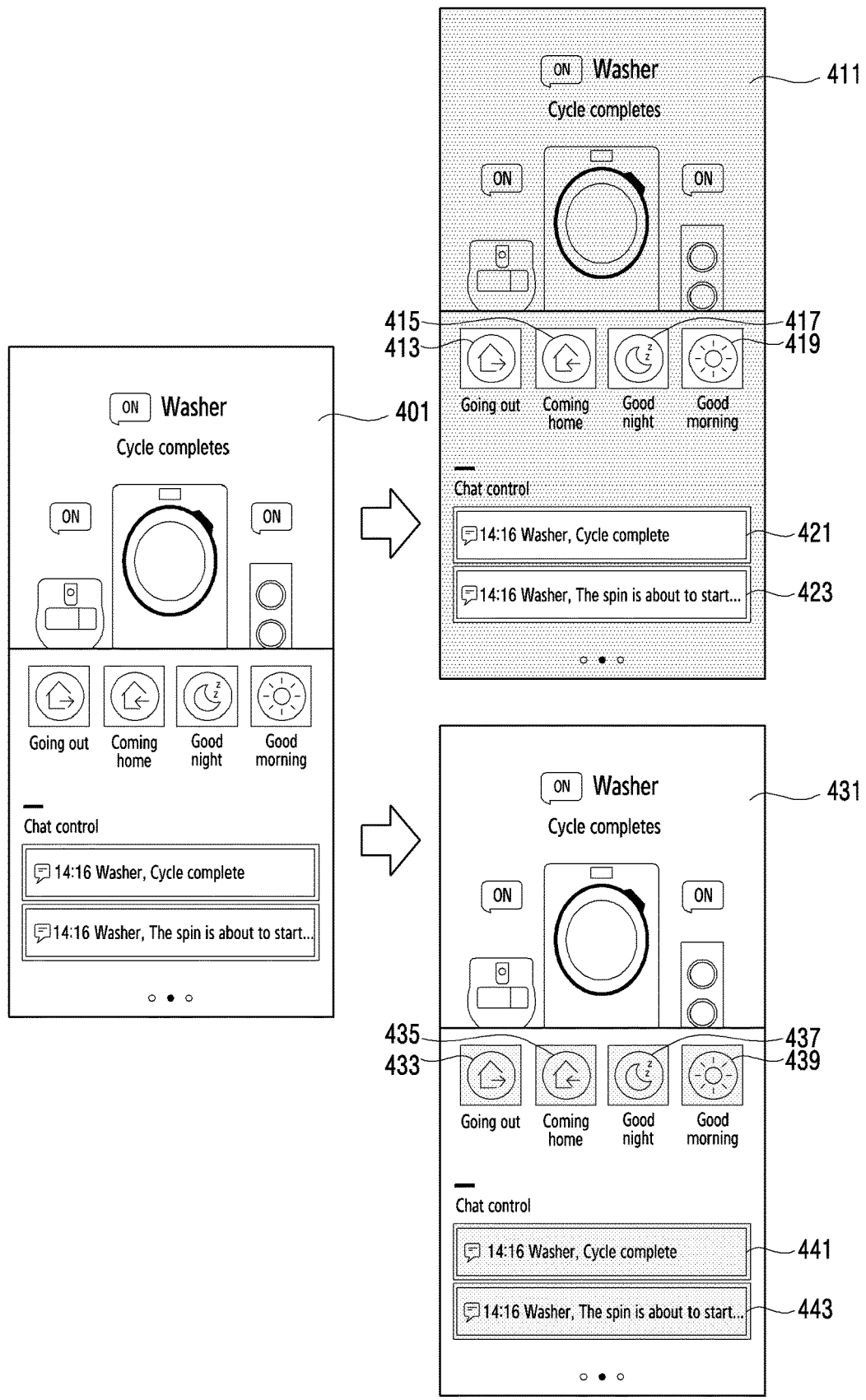
FIGS. 4A and 4B are views to explain a method for identifying at least one object for detecting a designated event in an electronic device according to various embodiments of the disclosure.
Figure 4B:
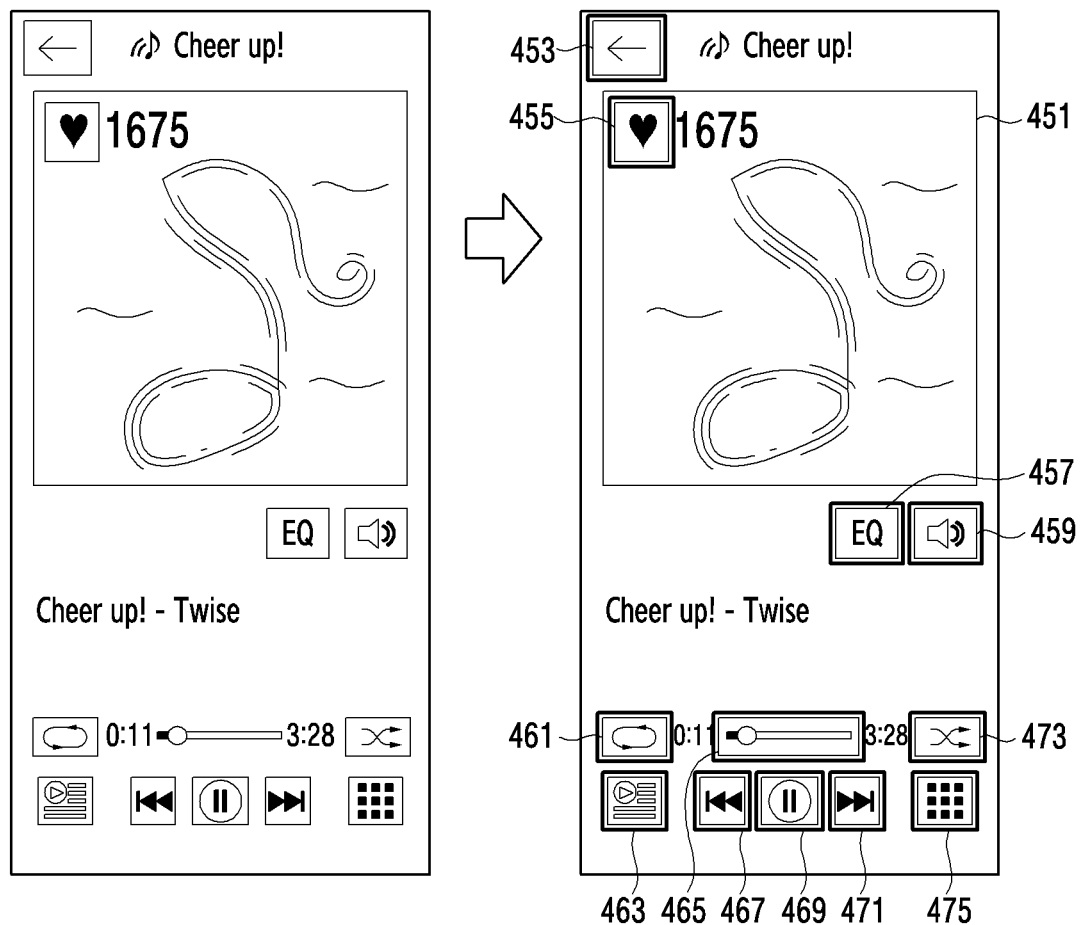

FIGS. 4A and 4B are views to explain a method for identifying at least one object for detecting a designated event in an electronic device according to various embodiments of the disclosure.

Referring to FIG. 4A, as in operation 201 of FIG. 2, when occurrence of a function mapping event is detected while an Internet of things (IoT) application is being executed, a processor (for example, the processor 120) of an electronic device (for example, the electronic device 101) may identify at least one object capable of detecting a touch event, on the basis of information regarding a layout of an application screen 401.

According to an embodiment, when the at least one object capable of detecting the touch event is identified, the processor may control a display (for example, the display device 160) to apply a designated effect (for example, a shading effect, a blur effect, etc.) to the other area 411 except for the at least one identified object 413, 415, 417, 419, 421, 424 on the application screen. Herein, the designated effect may be set and changed by the user or a manufacturer.

According to an embodiment, when the at least one object capable of detecting the touch event is identified, the processor may control the display to apply a designated effect (for example, a highlighting effect, a size changing effect, a shaking effect, etc.) to the at least one identified object 433, 435, 437, 439, 441, and 443 on the application screen.

Referring to FIG. 4B, as in operation 201 of FIG. 2, when occurrence of a function mapping event is detected while a music application is being executed, a processor (for example, the processor 120) of an electronic device (for example, the electronic device 101) may identify at least one object capable of detecting a touch event, on the basis of information regarding a layout of an application screen 451.

According to an embodiment, when the at least one object capable of detecting the touch event is identified, the processor may control a display to apply a designated effect (for example, a border highlighting effect, a size changing effect, a shaking effect, etc.) to the at least one identified object 453, 455, 457, 459, 461, 463, 465, 467, 469, 471, 473, and 475 on the application screen. Herein, the designated effect may be set and changed by the user or a manufacturer.

As described above, the electronic device may apply the designated effect to the at least one object capable of detecting the touch event, and accordingly, the user of the electronic device can easily recognize the object identified by the electronic device.

Figure 5:
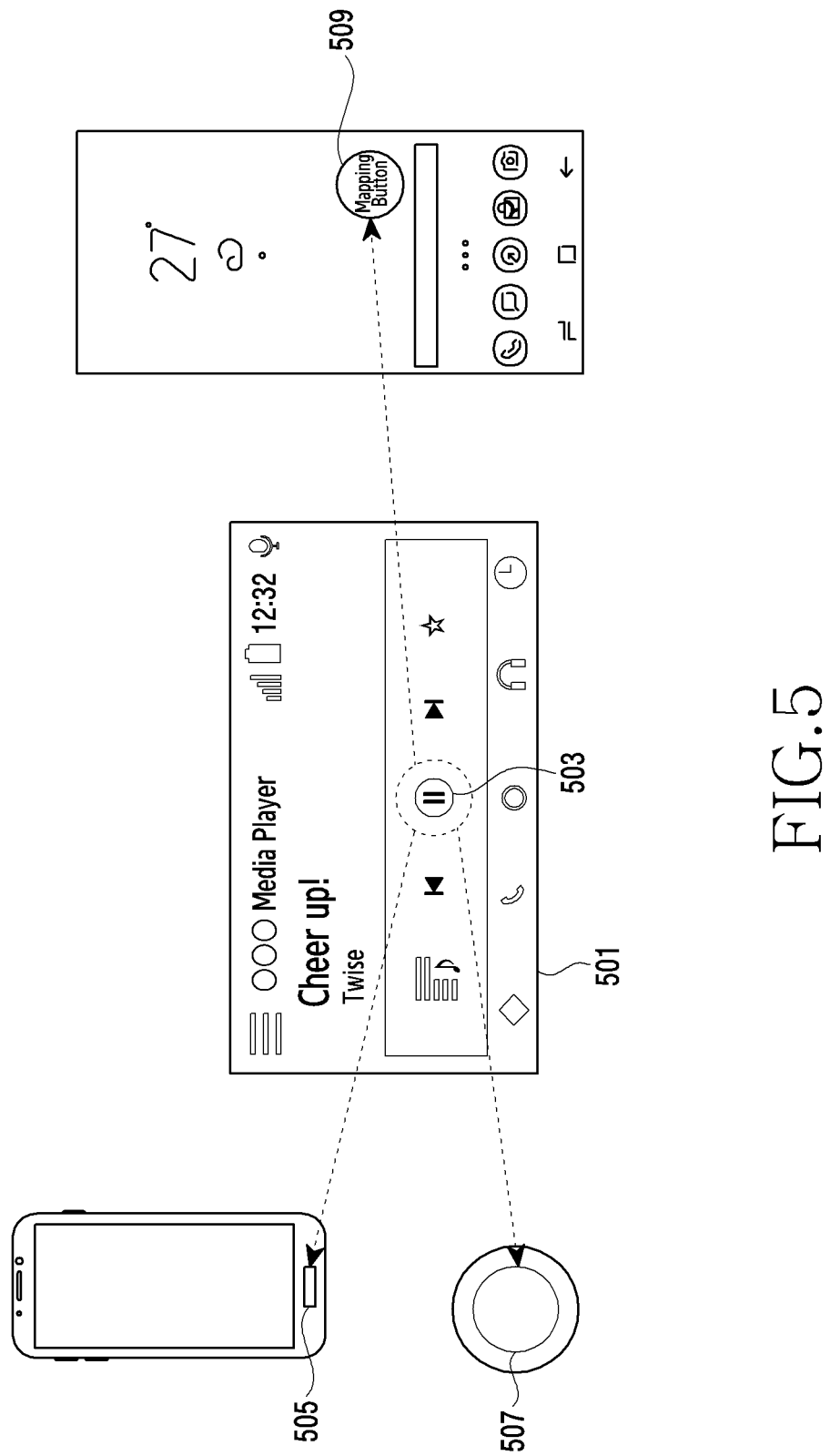
FIG. 5 is a view to explain a trigger event onto which a function of an application is mapped in an electronic device according to various embodiments of the disclosure.

FIG. 5 is a view to explain a trigger event onto which a function of an application is mapped in an electronic device according to various embodiments of the disclosure.

According to an embodiment, a processor (for example, the processor 120) of an electronic device (for example, the electronic device 101) may map a function (for example, a pause/play function) of an object 503 selected by an input for selecting any one of at least one object identified in an application screen 501, as in operation 205 of FIG. 2, onto at least one trigger event from among trigger events of a hardware key 505 of the electronic device, a signal of an external electronic device 507 (for example, a smart button) capable of performing wireless communication with the electronic device, and a soft key 509 provided through the screen of the application.

According to an embodiment, when an input on the hardware key 505 is received after the function of the selected object 503 is mapped onto the hardware key 505 of the electronic device, the processor may restore the application screen 501, and may generate a touch event on the selected object in the restored screen, thereby executing the function (for example, playing music) of the selected object 503.

According to an embodiment, when a signal (for example, a signal for executing the function) is received from the external electronic device 507 after the function of the selected object 503 is mapped onto the signal of the external electronic device 507, the processor may restore the application screen 501, and may generate a touch event on the selected object 503 in the restored screen, thereby executing the function (for example, playing music) of the selected object 503.

According to an embodiment, when an input on the soft key 509 is received after the function of the selected object 503 is mapped onto the soft key 509, the processor may restore the application screen 501, and may generate a touch event on the selected object 503 in the restored screen, thereby executing the function (for example, playing music) of the selected object 503.

Figure 6:
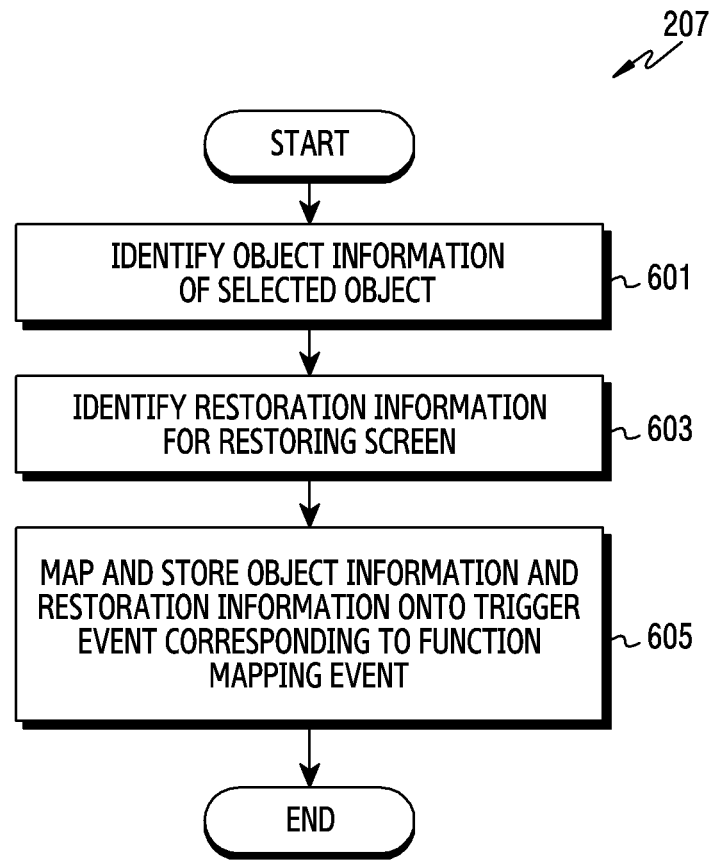
FIG. 6 is a flowchart to explain an example of a method for mapping and storing a function of an object onto a trigger event in an electronic device according to various embodiments of the disclosure.
Figure 7:
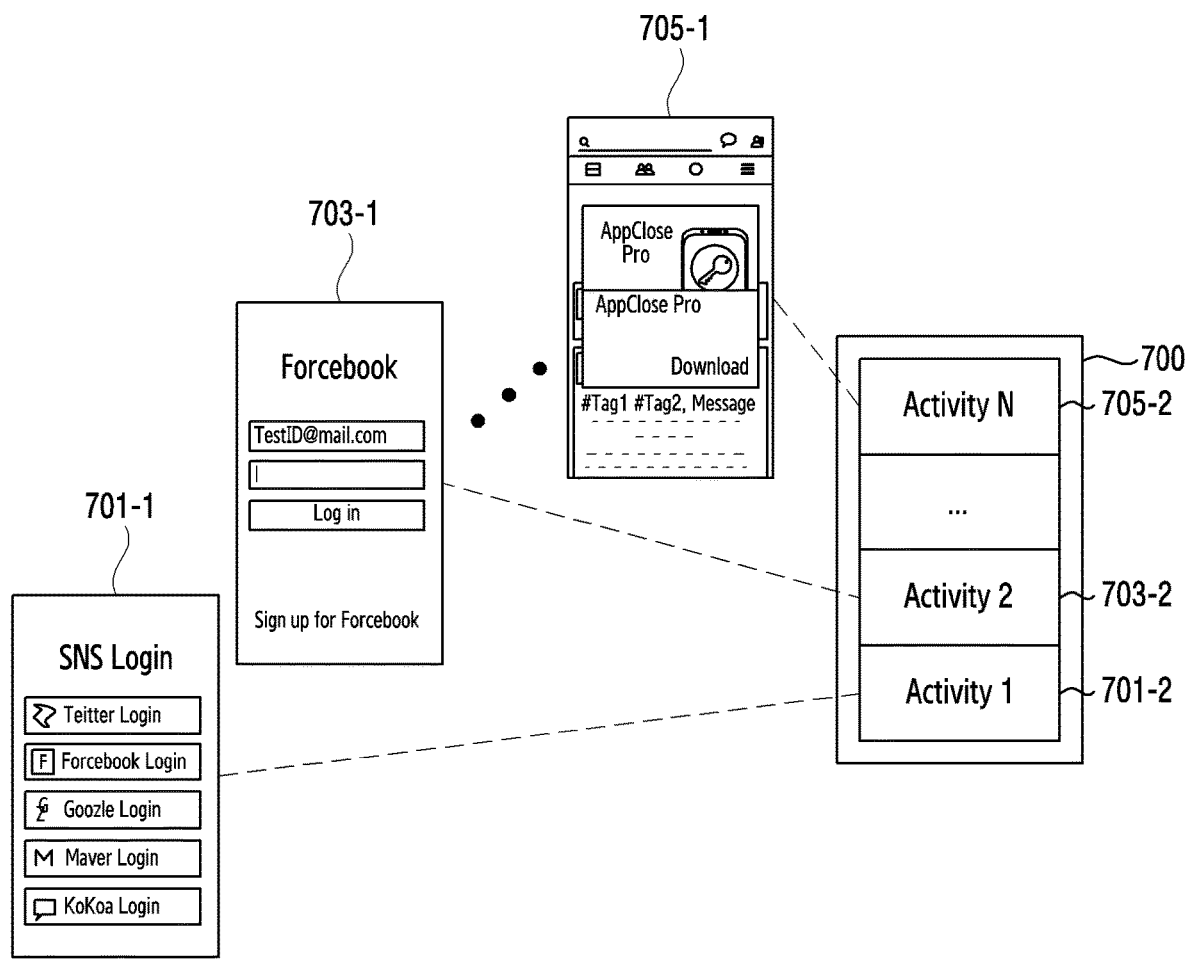
FIG. 7 is a view to explain restoration information generated in an electronic device according to various embodiments of the disclosure.

FIG. 6 is a flowchart to explain an example of a method for mapping and storing a function of an object onto a trigger event in an electronic device according to various embodiments of the disclosure. FIG. 7 is a view to explain restoration information generated in an electronic device according to various embodiments of the present disclosure.

Referring to FIG. 6, in operation 601, a processor (for example, the processor 120) of the electronic device (for example, the electronic device 101) may identify object information of a selected object. For example, the processor may identify position information (for example, coordinates information) in an application screen, object name information, and object ID information of an object selected by a user from among at least one object for detecting a designated event (for example, a touch event) in the application screen.

In operation 603, the processor may identify restoration information for restoring a screen. For example, the restoration information may include information regarding an entry route until a currently displayed application screen is displayed after the application is executed, information (for example, login information, input information, etc.) transmitted to display the application screen, or page information of the application screen, etc. According to an embodiment, the processor may acquire the restoration information from information stored in an activity stack. For example, when an input for executing a social application is received, the processor may display a first screen 701-1 of the social application, and may store an activity 701-2 associated with the first screen 701-1 in an activity stack 700 as shown in FIG. 7. When a user input of selecting a specific object (for example, Forcebook of FIG. 7) is received on the first screen 701-1 of the social application, the processor may display a second screen 703-1 (for example, a login screen) corresponding to the specific object, and simultaneously, may store an activity 703-2 associated with the second screen 703-1 in the activity stack 700. Thereafter, when a third screen 705-1 of an application is displayed according to a plurality of inputs for switching the screen, activities regarding all application screens displayed before the third screen 705-1 is displayed, and an activity 705-2 of the third screen 705-1 may be stored in the activity stack 700 in sequence. In addition, the processor may store pieces of information (for example, login information) inputted by the user on the application screen in the activity stack 700. Accordingly, the processor may identify restoration information such as information regarding an entry route to the third screen 705-1 of the currently displayed application after the social application is executed, and information (for example, login information, input information, etc.) transmitted to display the application screen, or page information of the application screen, through the information stored in the activity stack 700.

In operation 605, the processor may map and store the object information and the restoration information onto a trigger event corresponding to a function mapping event. For example, when a function mapping event is detected by a hardware key, the processor may map and store the object information and the restoration information onto one of the plurality of hardware keys of the electronic device. In another example, when a function mapping event is detected by a signal received from an external electronic device (for example, a smart button), the processor may map and store the object information and the restoration information onto the signal (for example, a trigger signal for performing a function) of the external electronic device. In another example, when a function mapping event is detected by a soft key provided through the display (for example, the display device 160) of the electronic device, the processor may generate a soft key for mapping a function of the application, and may map and store the object information and the restoration information onto the generated soft key.

Although it is illustrated in the above-described example that the electronic device maps and stores the object information and the restoration information onto the trigger event corresponding to the function event, the electronic device according to various embodiments of the disclosure may map and store the object information and the restoration information onto a specific trigger event set by the user or the manufacturer before the function mapping event occurs. For example, when a signal of the external electronic device (for example, a smart button) for executing a function is set as the trigger event by the user before the function mapping event occurs, the processor may map and store the object information and the restoration information onto the signal of the external electronic device for executing the function. In this case, the trigger event set by the user may be changed to another trigger event by the user.

Although it is illustrated in the above-described example that the electronic device maps and store the object information and the restoration information onto the trigger event corresponding to the function event, the electronic device according to various embodiments of the disclosure may map and store the object information and the restoration information onto a trigger event selected by the user. For example, when an object is selected, the processor of the electronic device may provide a user interface including various trigger events onto which object information and restoration information are mapped. When a specific trigger event is selected within the provided user interface, the processor may map and store the object information and the restoration information onto the selected trigger event.

Figure 8:
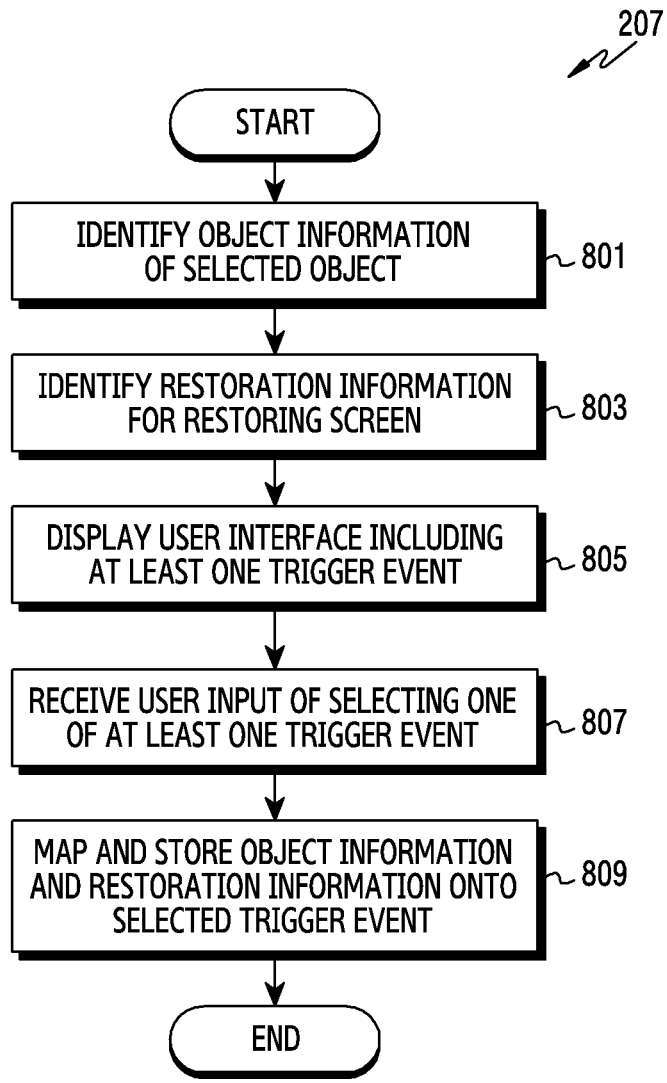
FIG. 8 is a flowchart to explain another example of a method for mapping and storing a function of an object onto a trigger event in an electronic device according to various embodiments of the disclosure.
Figure 9:
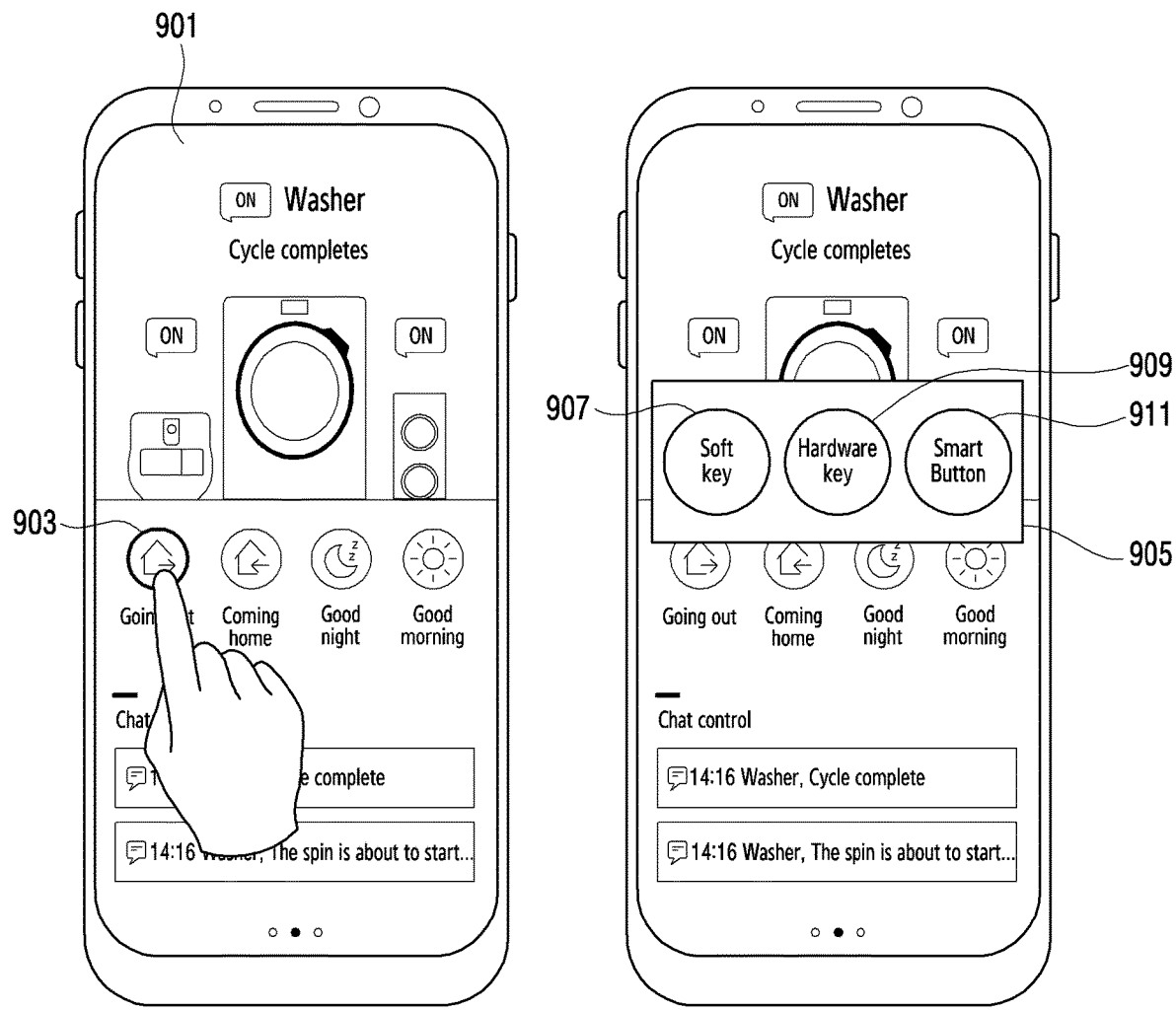
FIG. 9 is a view to explain a method for selecting a trigger event in an electronic device according to various embodiments of the disclosure.

FIG. 8 is a flowchart to explain another example of a method for mapping and storing a function of an object onto a trigger event in an electronic device according to various embodiments of the disclosure. FIG. 9 is a view to explain a method for selecting a trigger event in an electronic device according to various embodiments of the disclosure.

Referring to FIGS. 8 and 9, in operation 801, a processor (for example, the processor 120) of an electronic device (for example, the electronic device 101) may identify object information of a selected object. For example, as in operation of FIG. 6, the processor may identify position information (for example, coordinates information) in an application screen, object name information, and object ID information of the object selected by the user from among at least one object for detecting a designated event (for example, a touch input) in the application screen.

In operation 803, the processor may identify restoration information for restoring a screen. For example, as in operation 603 of FIG. 6, the restoration information may include information regarding an entry route until a currently displayed application screen is displayed after the application is executed, information (for example, login information, input information, etc.) transmitted to display the application screen, or page information of the application screen, etc. According to an embodiment, the processor may acquire the restoration information from information stored in an activity stack.

In operation 805, the processor may display a user interface including at least one trigger event. For example, when an input of selecting any one object (for example, a Going out icon) from at least one object for detecting a touch event on an application screen 901 is received as shown in FIG. 9, the processor may control a display (for example, a display device) to display a popup window including icons 907, 909, and 911 for selecting a trigger event in at least some areas of the application screen 901. According to an embodiment, when the electronic device is not connected with an external electronic device (for example, a smart button) via wireless communication, the icon 911 for selecting the smart button as a trigger event may not be displayed in the pop-up window 905.

In operation 807, the processor may receive a user input of selecting one of the at least one trigger event included in the user interface. For example, the processor may receive a touch input of selecting any one of the icons 907, 909, 911 displayed in the popup window 905.

In operation 809, the processor may map and store the object information and the restoration information onto the trigger event selected based on the touch input. For example, when a touch input on the icon 907 of selecting a soft key as a trigger event is received, the processor may generate a soft key (for example, the soft key 503) in a home screen (for example, the home screen 501) of the electronic device. The processor may map and store the object information and the restoration information onto information corresponding to the soft key generated in the home screen. In another example, when a touch input on the icon 909 of selecting a hardware key as a trigger event is received, the processor may map and store the object information and the restoration information onto information corresponding to a hardware key designated from among the plurality of hardware keys included in the electronic device. In still another example, when a touch input on the icon 911 for selecting a smart button as a trigger event is received, the processor may map and store the object information and the restoration information onto information associated with a signal transmitted by a smart key to execute a function.

Figure 10:
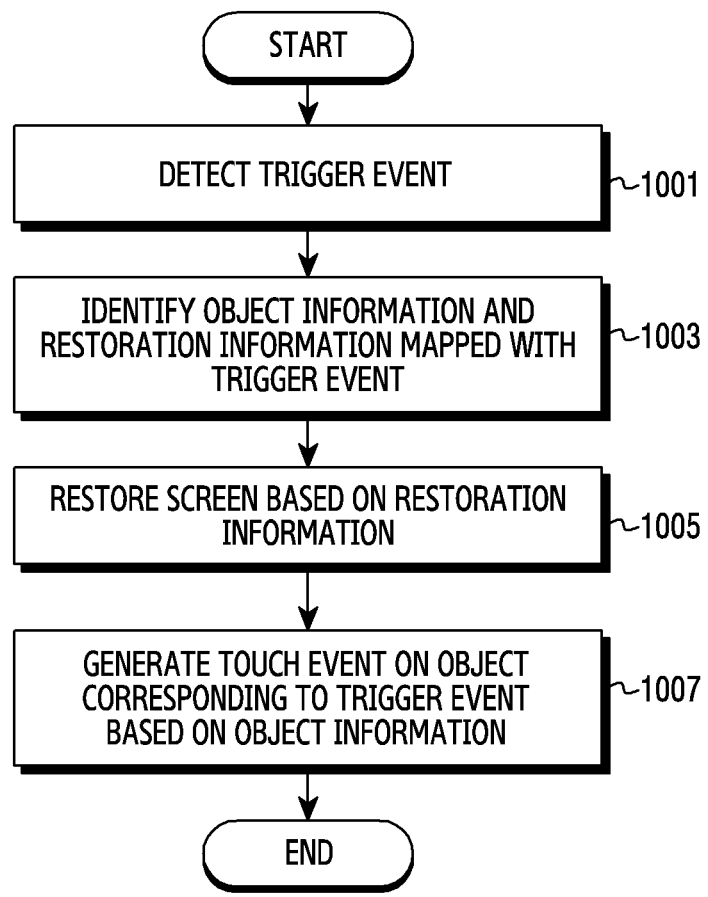
FIG. 10 is a flowchart to explain a method for performing a function of an application mapped onto a trigger event in an electronic device according to various embodiments of the disclosure.

FIG. 10 is a flowchart to explain a method for performing a function of an application mapped onto a trigger event in an electronic device according to various embodiments of the disclosure.

Referring to FIG. 10, in operation 1001, a processor (for example, the processor 120) of an electronic device (for example, the electronic device 101) may detect a trigger event. For example, when an input on a hardware key mapped with a function of a specific application is received, the processor may determine that the trigger event for performing the specific function of the specific application is detected. In another example, when a touch input on a soft key (for example, the soft key 503) for performing a specific function of a specific application from among objects displayed in a home screen (for example, the home screen 501) is detected, the processor may determine that the trigger event for performing the specific function of the specific application is detected. In still another example, when a signal for executing a function is received from an external electronic device (for example, a smart button) connected with the electronic device through a communication circuit (for example, the communication module 190) via wireless communication, the processor may determine that a trigger event for performing a specific function of a specific application mapped onto the received signal is detected.

In operation 1003, the processor may identify object information and restoration information mapped with the trigger event. For example, the processor may load, from a memory (for example, the memory 130), the object information including at least one of position information, object name information, object ID information of the object mapped with the trigger event. In addition, the processor may load, from the memory, the restoration information including at least one of information regarding an entry route until a currently displayed application screen is displayed after the application is executed, information (for example, login information, input information, etc.) transmitted to display the application screen, or page information of the application screen.

In operation 1005, the processor may restore a screen on the basis of the restoration information. For example, the processor may restore an application screen (for example, the application screen 301, 311, 321, 331, 341) displayed through a display (for example, the display device 160) when a function mapping event occurs, on the basis of the restoration information. When the application screen displayed through the display when the function mapping event occurs is the third screen 705-1 of FIG. 7, the processor may control the display to display the third screen 703-1 by restoring the screens from the first screen 701-1 of the application in sequence on the basis of the restoration information.

In operation 1007, the processor may generate a touch event on an object corresponding to the trigger event, on the basis of the object information. For example, the processor may identify an object selected by the user when the function mapping event occurs from among at least one object included in the restored screen, on the basis of the object information. The processor may perform a function corresponding to the identified object by generating a touch event on the identified object. For example, when the identified object is the Going out icon 903 of FIG. 9, the processor may control a communication circuit (for example, the communication module 190) to transmit a signal for turning off power or for operating in a sleep mode to external electronic devices controllable through the application.

As described above, the electronic device may immediately provide a function of an application mapped onto a trigger event in response to the trigger event being detected. Accordingly, the user of the electronic device may map a trigger event onto a function of an application frequently used, such that the function of the application can be rapidly and more easily provided.

According to various embodiments, a method for mapping a function of an application in an electronic device (for example, the electronic device 101) may include: detecting occurrence of a function mapping event while an application screen is being displayed; identifying at least one object for detecting a designated event from among at least one object displayed on the application screen; receiving an input for selecting any one of the at least one identified object; and mapping and storing a function of the object selected based on the input onto a trigger event.

According to various embodiments, detecting the occurrence of the function mapping event may include detecting the occurrence of the function mapping event, on the basis of an input on at least one hardware key designated from among a plurality of hardware keys exposed through at least a portion of a housing of the electronic device.

According to various embodiments, detecting the occurrence of the function mapping event may include detecting the occurrence of the function mapping event, on the basis of a touch input on a soft key for requesting function mapping from among a plurality of soft keys provided through a display of the electronic device.

According to various embodiments, detecting the occurrence of the function mapping event may include detecting the occurrence of the function mapping event, on the basis of whether a signal for requesting function mapping is received from an external electronic device which performs wireless communication with the electronic device.

According to various embodiments, identifying the at least one object for detecting the designated event may include identifying at least one object for detecting a touch event from among the at least one object displayed on the application screen.

According to various embodiments, the method for mapping the function of the application in the electronic device may further include applying a designated effect to the at least one identified object.

According to various embodiments, the method for mapping the function of the application in the electronic device may further include applying a designated effect to the other area except for the identified object on the application screen.

According to various embodiments, mapping and storing the function of the object selected based on the input onto the trigger event may include: identifying object information of the object selected based on the input; identifying restoration information for restoring the application screen; and mapping and storing the object information and the restoration information onto the trigger event corresponding to the function mapping event.

According to various embodiments, mapping and storing the function of the object selected based on the input onto the trigger event may include: identifying selected object information based on the input; identifying restoration information for restoring the application screen; displaying a user interface including at least one trigger event; receiving a user input of selecting one of the at least one trigger event; and mapping and storing the object information and the restoration information onto the trigger event selected based on the user input.

According to various embodiments, the method for mapping the function of the application in the electronic device may further include: detecting the trigger event; identifying object information and restoration information which are mapped onto the trigger event; restoring the application screen on the basis of the restoration information; and generating a touch event on an object corresponding to the trigger event on the basis of the object information.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of the disclosure is defined not by the described embodiments but by the appended claims, and all differences within the scope will be construed as being included in the disclosure.

The invention claimed is:

1. An electronic device comprising:
a display;
a memory; and
a processor operatively connected with the display and the memory,
wherein the processor is configured to:
identify at least one object capable of detecting a touch event from among at least one object displayed on an application screen, based on information regarding a layout of the application screen, wherein the identified at least one object is an icon that performs a corresponding function based on detecting the touch event;
receive an input for selecting any one of the identified at least one object;
identify object information of the object selected based on the input, wherein the object information comprises coordinate information in the application screen;
identify restoration information for restoring the application screen, wherein the restoration information comprises information regarding an entry route until the application screen is displayed after the application is executed and user's input information, wherein the information regarding the entry route includes the application screen and at least one previous screen, and wherein the user's input information includes first information inputted to the application screen and second information inputted to the at least one previous screen by the user, and the user's input information further includes login information of the user;
display, on the display, a list of trigger items corresponding to a plurality of trigger events, wherein the trigger events includes an event of touching a soft key on the display, an event of pressing a hardware key of the electronic device and an event of wirelessly connecting with a predetermined external electronic device, and wherein a trigger item corresponding to the event of wirelessly connecting with the predetermined external electronic device is selectively included in the list of trigger items according to whether the predetermined external electronic device is being connected with the electronic device or not;
receive a user input to select one of the trigger items in the list;
map and store the object information and the restoration information onto a trigger event corresponding to the selected one of trigger items in the list; and
in response to detecting the trigger event corresponding to the selected one of trigger items in the list, after the object information and the restoration information are mapped and stored onto the trigger event corresponding to the selected one of trigger items in the list:
restore the application screen based on the restoration information, wherein the application screen and the at least one previous screen are identified based on the entry route in the restoration information, and wherein the first information is inputted to the application screen and the second information is inputted to the at least one previous screen based on the restoration information;
identify the object on the restored application screen based on the coordinate information; and
generate a touch event on the object.

2. The electronic device of claim 1, wherein the hardware key is designated from among a plurality of hardware keys exposed through at least a portion of a housing of the electronic device.

3. The electronic device of claim 1, wherein the soft key is one of a plurality of soft keys provided through the display.

4. The electronic device of claim 1, further comprising a communication circuit configured to connect with the predetermined external electronic device via wireless communication,
wherein the processor is configured to detect the event of wirelessly connecting with the predetermined external electronic device, on the basis of whether a signal for requesting function mapping is received from the predetermined external electronic device through the communication circuit.

5. The electronic device of claim 1, wherein the processor is configured to apply a designated effect to the identified at least one object.

6. The electronic device of claim 1, wherein the processor is configured to apply a designated effect to the other area except for the identified at least one object on the application screen.

7. A method for mapping a function of an application in an electronic device, the method comprising:
identifying at least one object capable of detecting a touch event from among at least one object displayed on an application screen, based on information regarding a layout of the application screen, wherein the identified at least one object is an icon that performs a corresponding function based on detecting the touch event;
receiving an input for selecting any one of the identified at least one object;
identifying object information of the object selected based on the input, wherein the object information comprises coordinate information in the application screen;
identifying restoration information for restoring the application screen, wherein the restoration information comprises information regarding an entry route until the application screen is displayed after the application is executed and user's input information, wherein the information regarding the entry route includes the application screen and at least one previous screen, and wherein the user's input information includes first information inputted to the application screen and second information inputted to the at least one previous screen by the user, and the user's input information further includes login information of the user;
displaying, on a display of the electronic device, a list of trigger items corresponding to a plurality of trigger events, wherein the trigger events includes an event of touching a soft key on the display, an event of pressing a hardware key of the electronic device and an event of wirelessly connecting with a predetermined external electronic device, and wherein a trigger item corresponding to the event of wirelessly connecting with the predetermined external electronic device is selectively included in the list of trigger items according to whether the predetermined external electronic device is being connected with the electronic device or not;
receiving a user input to select one of the trigger items in the list;

mapping and storing the object information and the restoration information onto a trigger event corresponding to the selected one of trigger items in the list; and in response to detecting the trigger event corresponding to the selected one of trigger items in the list, after the object information and the restoration information are mapped and stored onto the trigger event corresponding to the selected one of trigger items in the list:

restoring the application screen based on the restoration information, wherein the application screen and the at least one previous screen are identified based on the entry route in the restoration information, and wherein the first information is inputted to the application screen and the second information is inputted to the at least one previous screen based on the restoration information;

identifying the object on the restored application screen based on the coordinate information; and generating a touch event on the object.

8. The method of claim 7, wherein one the hardware key is designated from among a plurality of hardware keys exposed through at least a portion of a housing of the electronic device.

9. The method of claim 7, wherein the soft key is one of a plurality of soft keys provided through a display of the electronic device.

10. The method of claim 7, wherein the event of wirelessly connecting with the predetermined external electronic device is detected, on the basis of whether a signal for requesting function mapping is received from the predetermined external electronic device which performs wireless communication with the electronic device.

* * * * *